United States Patent [19]

Mercer

[11] 4,325,068
[45] Apr. 13, 1982

[54] LORAN-C SIGNAL PROCESSOR

[75] Inventor: William R. Mercer, Belmont, Mass.

[73] Assignee: Sanders Associates, Inc., Nashua, N.H.

[21] Appl. No.: 918,750

[22] Filed: Jun. 26, 1978

[51] Int. Cl.³ .............................................. G01S 1/24
[52] U.S. Cl. .................................. 343/103; 455/304; 455/305
[58] Field of Search ........................ 343/103, 17.1 R; 325/476; 455/304, 305

[56] References Cited

U.S. PATENT DOCUMENTS

| | | | |
|---|---|---|---|
| 3,121,224 | 2/1964 | Bachmann | 343/17.1 R X |
| 3,213,450 | 10/1965 | Goor | 343/17.1 R |
| 3,378,847 | 4/1968 | Grover et al. | 343/103 |
| 3,947,849 | 3/1976 | Fehlner et al. | 348/103 |
| 4,134,117 | 1/1979 | Robinson et al. | 343/103 |
| 4,224,623 | 9/1980 | Mercer et al. | 343/103 |
| 4,238,766 | 12/1980 | Masuda | 455/304 X |

Primary Examiner—T. H. Tubbesing
Attorney, Agent, or Firm—Louis Etlinger; Ronald Reichman

[57] ABSTRACT

A Loran-C receiver signal processor is disclosed which processes radio frequency Loran-C signal pulses on a point-by-point, cycle-by-cycle basis to provide the ability to locate on each pulse a tracking point which is used for accurate time difference of arrival measurements between successively received signal pulses or to improve the signal-to-noise ratio of the received signal.

11 Claims, 6 Drawing Figures

LORAN-C SIGNAL PROCESSOR

FIELD OF THE INVENTION

This invention relates to navigational equipment and more particularly to hyperbolic navigation equipment utilizing time difference of arrival measurements between shaped radio frequency pulses transmitted from synchronized ground transmitting stations.

BACKGROUND OF THE INVENTION

LORAN-C is a pulsed, low-frequency (100 Khz) hyperbolic radio navigation system. LORAN-C radio navigation system chains employ three or more synchronized ground stations that each transmit periodic radio frequency pulse trains having, at the respective start of transmissions, a fixed time relationship to each other. The first station to transmit is referred to as the master station, while the other stations are referred to as the secondary stations. The pulse trains are radiated to receiving equipment generally located on aircraft or ships whose positions are to be accurately determined. Each pulse of the pulse trains transmitted by each of the master and secondary stations has an extremely accurate envelope shape, and each pulse train is transmitted at a constant, precise repetition rate called the Group Repetition Interval, with each pulse in a group separated in time from a subsequent pulse by a precise, fixed time interval. In addition, the secondary station pulse train transmissions are delayed a sufficient amount of time after the master station pulse train transmissions to assure that their time of arrival at receiving equipment anywhere within the operational area of the particular Loran-C chain will follow receipt of the pulse train from the master station.

Since the series of pulses transmitted by the master and secondary stations is in the form of pulses of electromagnetic energy which are propagated at a constant velocity, the difference in time of arrival of pulses for a master and a secondary station represents the difference in the length of the transmission paths from the transmitting stations to the Loran-C receiving equipment. The locus of all points on a Loran-C chart representing a constant difference in distance from a master and a secondary station, as indicated by a fixed time difference of arrival of their 100 Khz carrier pulse trains, is a hyperbola. The Loran-C navigation system makes it possible for a navigator to utilize this hyperbolic relationship and precisely determine position using a Loran-C chart on which are located families of hyperbolic curves, each family associated with a particular master-secondary pair of transmitting stations. The modern day Loran-C system provides equipment position location accuracy within 200 feet with a repeatability of within 50 feet.

The detailed operation of the Loran-C radio navigation system is described in a pamphlet put out by the Department of Transportation, U.S. Coast Guard, No. CG-462 dated August, 1974, and entitled "Loran-C User Handbook".

The discrete pulses radiated by each master and each secondary Loran-C transmitter are characterized by extremely precise spacing of 1,000 microseconds between adjacent pulses. Any given point on the precisely shaped envelope of each pulse is also separated by exactly 1,000 microseconds from the corresponding point on the envelope of a preceding or subsequent pulse within the eight pulse trains. To insure such precise time accuracy each master and secondary station transmitter is controlled by a cesium frequency standard clock and the clocks of master and secondary stations are synchronized with each other.

To make the precise time difference of signal arrival measurements required for the Loran-C positional accuracy, the zero crossing of a specific (usually the start of the third) carrier frequency cycle of each pulse must be located. These zero crossings are used to make the time difference of signal arrival measurements in a well-known manner. In theory this will work, but in actual operation noise at and about the same frequency as the carrier frequency of the Loran-C pulses makes the task very difficult. To help locate the third carrier cycle zero crossing, each pulse has an exact pulse shape wherein the maximum positive slope of the pulse envelope is at the third cycle zero crossing. By taking the first derivative of the pulse envelope waveform the maximum positive slope point is found.

A problem exists in the prior art in that the signal strength of received signals very often is weak and in combination with received noise within the passband of the Loran-C receiver results in low signal-to-noise ratios. As the result of low signal-to-noise ratios location of the third carrier cycle zero crossing of each pulse becomes very difficult and many times impossible utilizing existing state of the art equipment. This results in faulty time difference of signal arrival measurements and reliability of the Loran-C equipment is decreased. In addition, received noise distorts the envelope of received pulses and can cause erroneous identification of other than the third cycle zero crossing, thereby causing error in time difference of signal arrival measurements.

The aforementioned problems are exacerbated by the prior art technique of first detecting received signals and then processing the resulting pulse waveform to locate the third cycle zero crossing. As is known to those skilled in the art the detection process decreases the signal-to-noise ratio.

Thus, there is a need in the art for circuitry and techniques that improve the tracking point signal-to-noise ratio of received Loran-C signals and which also improve the ability to find a specified carrier frequency zero crossing to increase the reliability of Loran-C measurements.

SUMMARY OF THE INVENTION

The foregoing needs of the prior art are satisfied by my novel Loran-C signal processor which increases the tracking point signal-to-noise ratio of received Loran-C pulse signals while also improving the ability to find a specified carrier zero crossing used to make the time difference of signal arrival measurements.

In accordance with the teaching of my invention my novel signal processor improves the signal-to-noise ratio in two ways. First, my novel processor does not work with the detected Loran-C pulse waveform as is done in the prior art, but rather works with the undetected pulse on a carrier point-by-point, cycle-by-cycle basis. Second, my processor improves the signal-to-noise ratio by actually eliminating some of the received noise without adversely affecting the received pulse signal.

My novel processor also locates the Loran-C pulse third carrier cycle zero-crossing by a technique different than taking the first or second derivative of the detected pulse envelope waveform.

As a signal-to-noise enhancer for Loran-C tracking, my signal processor basically functions by taking a received undetected Loran-C radio frequency pulse, delaying or shifting it by an integral number of one-half cycles of the carrier frequency, and then, on a continuous point-by-point, cycle-by-cycle basis, combining the delayed signal with an equal amplitude portion of the undelayed signal in such a manner as to cancel that component of the signal carrier which did not change in amplitude during the delay time. The result is a new signal with the same carrier frequency as the received pulse and with an envelope waveform that approximates the first time derivative of the received radio frequency pulse envelope waveform. Thus, the new signal has its maximum amplitude at the normal third cycle tracking point where the received Loran-C pulse has its maximum rate-of-amplitude-rise.

In a frequency spectrum sense, my processor acts as a narrow band rejection filter with a null at the Loran-C carrier frequency, removing the slowly changing components of noise centered thereat as well as the slowly changing components of the Loran-C pulse. At the normal tracking point, only three cycles after the start of the Loran-C pulse, the carrier and slowly changing components contribute relatively little to the instantaneous signal. However, the interfering noise is continuously on-going so that its corresponding longer coherency components are fully effective in interfering at the time tracking point. By removing these more coherent noise components, my processor improves the signal-to-noise ratio at the third cycle tracking point.

The new signal output from my processor providing Loran-C tracking point signal-to-noise enhancement has a suppressed carrier as seen in FIG. 3B; its envelope goes from positive to negative, i.e., its instantaneous carrier reverses phase, at the peak of the received pulse where amplitude is constant (the condition rejected) and rate-of-amplitude-rise changes to rate-of-amplitude-fall. This instantaneous phase reversal can be used to locate the normal third cycle Loran-C tracking point by again applying my processor in the same manner, this time to the signal-to-noise enhanced new signal resultant from its first application to produce a second new signal with an instantaneous carrier phase reversal corresponding to the third cycle Loran-C tracking point.

Alternatively, by adjusting my processor so that the ratio of delayed signal to undelayed signal being combined is other than unity, components of the input signal growing or decaying during the delay time at rates other than zero may be made to cancel. By this means, the cancellation point and so the phase reversal of the new signal instantaneous carrier can be placed at any time of the input Loran-C signal, determined only by the envelope shape and independent of signal strength. Thus, this carrier phase reversal produced by my processor can be used to indicate any desired point along the Loran-C signal, including the normal tracking point, either directly from the received signal or in sequence after signal-to-noise enhancement.

My novel Loran-C signal processor will be better understood upon a review of the detailed description in conjunction with the drawing in which.

DETAILED DESCRIPTION

Figure 1:
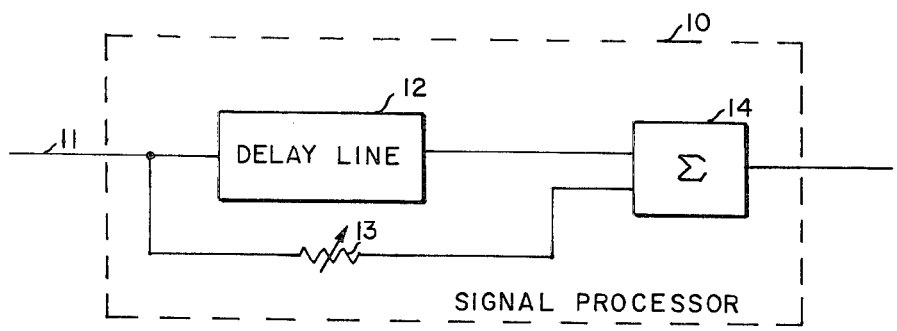
FIG. 1 is a block schematic diagram of my novel Loran-C signal processor.
Figure 2A:
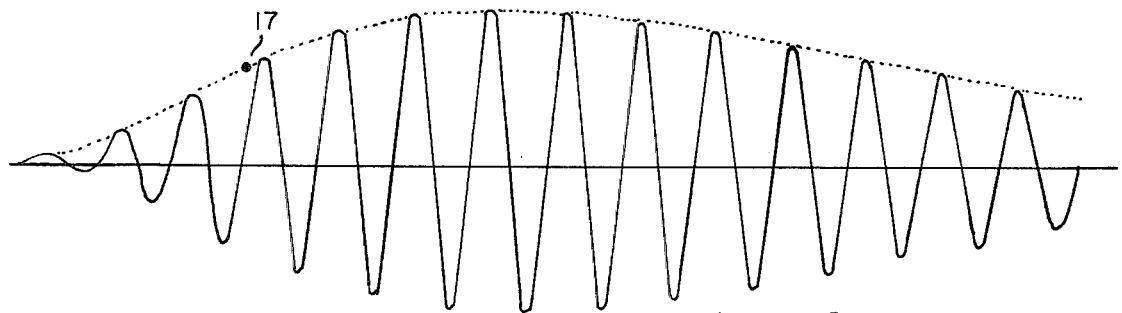
FIG. 2A shows the pulse waveform with radio frequency carrier of a LORAN-C pulse.
Figure 3A:
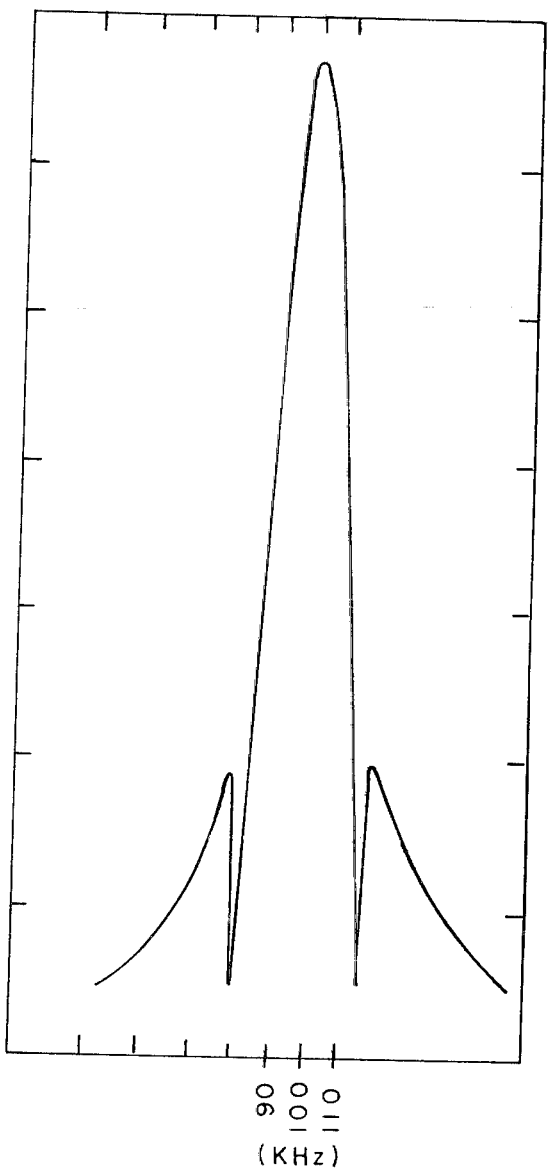
FIG. 3A shows the frequency spectrum of the received LORAN-C signals.
Figure 3B:
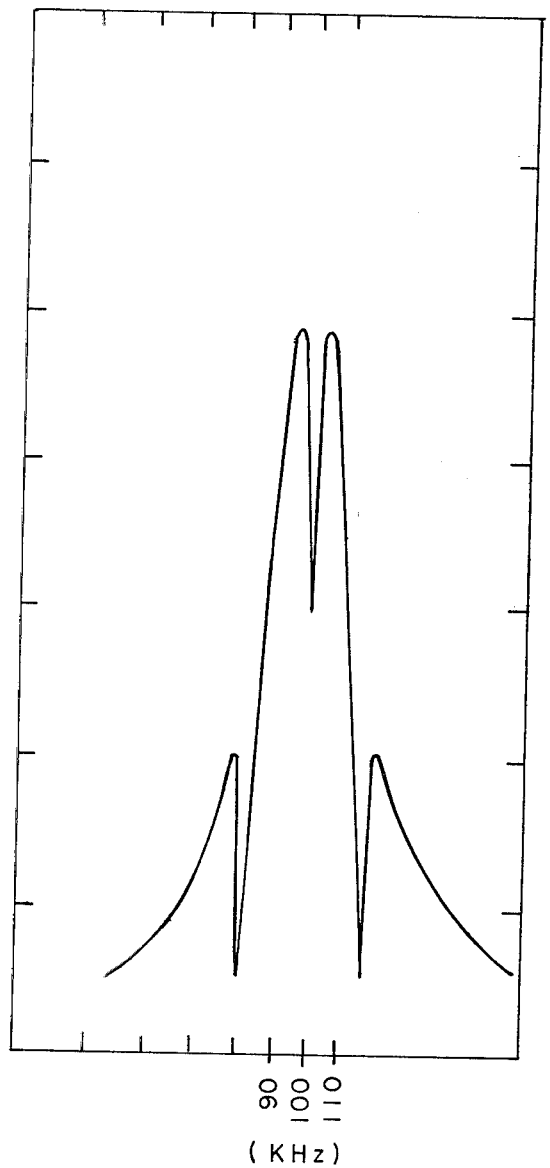
FIG. 3B shows the frequency spectrum of the new signal generated by the present invention with the suppressed carrier providing an improved signal-to-noise ratio.

FIG. 1 shows the detailed block diagram of my novel signal processor 10. The signal waveform input to the signal processor 10 is shown in FIG. 2A and is the signal transmitted by the Loran-C master and secondary stations. An antenna and receiver (both not shown) well known in the art are used to receive the Loran-C signals which have a frequency spectrum including an unsuppressed 100 kilohertz carrier and both sidebands as shown in FIG. 3A. The received signal is not immediately detected to obtain the pulse envelope waveform as is standardly done in the art. Instead, the received but undetected signals are input to signal processor 10 at input 11. The input signal is applied to a transmission means in the form of delay line 12 and to another transmission means in the form of impedance 13. Impedance 13 is adjusted to have a small amount of impedance equal to the impedance of delay line 12 in one instance, and unequal in another instance, depending on whether or not it is desired to optimize signal-to-noise ratio or to locate a specific tracking point.

The time delay introduced by delay line 12 is five microseconds in the embodiment of my invention disclosed herein. This delay is equal to one-half the period of the 100 Kilohertz carrier frequency. The delay may be other multiples of five microseconds such as ten microseconds or twenty-five microseconds. The five microsecond delay is exactly one-half cycle of the 100 kilohertz carrier frequency.

Figure 2B:
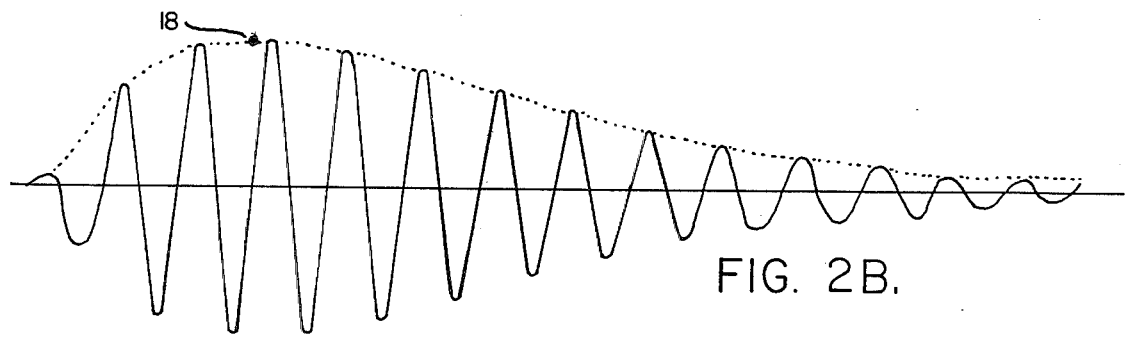
FIG. 2B shows the pulse waveform output from the signal processor.
Figure 2C:
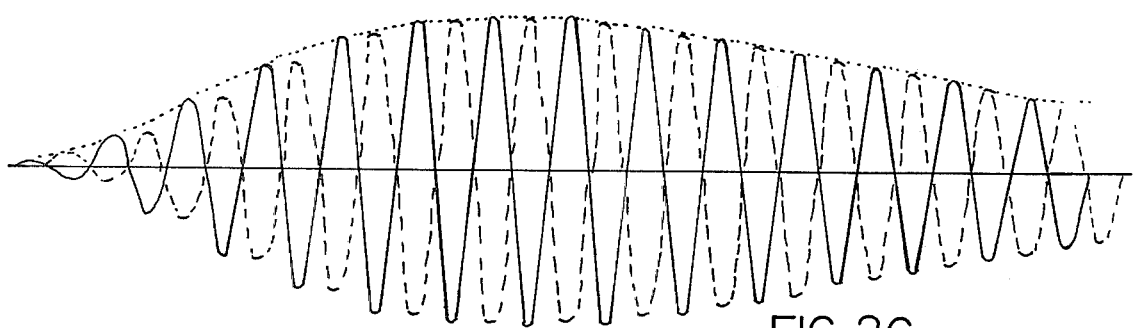
FIG. 2C shows an overlay of a LORAN-C signal and the LORAN-C signal delayed one-half cycle that are input to summer 14.

In FIG. 2C is shown an overlay of the original signal applied to summer or combiner 14 via impedance 13 (shown solid) and the signal applied to summer or combiner 14 via delay line 12 (shown dotted). From FIG. 2C it can be seen that summer or combiner 14 algebraically combines the input signals by adding the positive half cycle of one of its two input signals with the negative half cycle of the other of its two input signals and visa versa at all times during its operation. The waveform of the signal output from summer 14 depends on the adjustment of impedance 13 to achieve varying results. Only one of the results is shown by the waveform in FIG. 2B.

In one case, not that shown in FIG. 2B, impedance 13 can be adjusted so that its impedance equals the impedance of delay line 12. The result is that the amplitudes of the two signals input to combiner 14 are the same. In this instance the signal-to-noise ratio is optimized at the nominal tracking point as the envelope waveform of the signal output from combiner 14 is the first derivative of the envelope of the signal input to processor 10. This is accomplished on a continuous point-by-point, cycle-by-cycle basis in contrast to the prior art. The peak of this first derivative envelope waveform signal occurs at the same point in time as the third carrier cycle positive zero crossing due to the positive slope of the input signal envelope waveform being maximum as is well known in the art. Signal-to-noise ratio is particularly improved where there is the most rapid rate of modulating envelope change as occurs at the same point in time as the third carrier cycle positive zero crossing. At the peak of the signal input to processor 10 the amplitude of the positive half cycles of the signal passing through impedance 13 will equal the amplitude of the negative half cycles of the signal passing through delay line 12, so the output of combiner 14 is zero at this time reflecting the zero slope of the peak of the envelope waveform.

While that which has been described hereinabove is at present considered to be the preferred embodiment of my invention, it is illustrative only, and various changes and modifications may be made by those skilled in the art without departing from the scope and spirit of my invention as claimed below.

In alternative embodiments of my invention the impedance 13 and delay line 12 transmission means may be other than a variable resistor and a delay line and still practice the teaching of my invention. Both transmission means may comprise active devices such as transistors which can be used to scale the amplitude of the input signal as well as to introduce the appropriate phase shift. A digitally clocked analog delay, such as a bucket brigade circuit which may be implemented with charge coupled device technology, may be utilized to accomplish controlled signal delay. The only thing that is important is that the comparative amplitude and phase difference as previously described are achieved. In another embodiment, the transmission means may be a piece of wire with finite resistance, while the other transmission means may be used to accomplish amplitude scaling as well as the phase shifting. In another embodiment of my invention the delayed signal may be algebraically combined with a successively received signal pulse, whether the successively received pulse is in the same pulse train or a subsequent pulse train.

What I claim is:

1. A signal processor processing amplitude modulated radio frequency signals of known carrier frequency to improve the signal-to-noise ratio in portions thereof having rapid rate of modulating envelope change comprising:
   a first transmission means to which said radio frequency signals are applied and are scaled in amplitude by a known scaling factor before being output therefrom;
   a second transmission means to which said radio frequency signals are also applied to be delayed in time by an integral multiple of one-half periods of the carrier frequency of said radio frequency signal with relationship to said first transmission means before being output therefrom; and
   means for algebraically combining the radio frequency signals output from both said first and second transmission means when their differential delay is an odd integral multiple of one-half carrier periods, to produce a new signal having an improved signal-to-noise ratio in the portions thereof having rapid rate of modulating envelope change.

2. The signal processor in accordance with claim 1 wherein the scaling factor of said first transmission means is such that the amplitude of the radio frequency signals input to said combining means from said first and second transmission means are substantially equal and differ only in time of occurrence, and the signal output from said combining means is a radio frequency signal having a suppressed carrier of the same frequency as the radio frequency signals input thereto and have an envelope modulation waveform that is an approximation of the first time derivative of said amplitude modulated ratio frequency input signals.

3. A hyperbolic navigation receiver signal processor processing shaped amplitude modulated radio frequency pulse signals to improve the signal-to-noise ratio in portions of the radio signal comprising:
   delay means to which said radio frequency signals are applied and output therefrom after being delayed in time by an integral multiple of one-half periods of the carrier frequency of said radio frequency signals;
   impedance means to which said radio frequency signals are also applied and then output therefrom; and
   means for algebraically combining the radio frequency signals output from both said delay means and said impedance means to produce a new amplitude modulated signal having the same carrier radio frequency, said new signal having a frequency spectrum that rejects noise at said new signal frequency.

4. The signal processor in accordance with claim 3 wherein said impedance means has substantially the same impedance as said delay means so that the radio frequency signals output from said delay means and from said impedance means are substantially of the same amplitude.

5. The signal processor in accordance with claim 2 or 3 wherein said impedance means has the same impedance as said delay means so that the radio frequency signals output from said impedance means and said delay means are of the same amplitude, and the envelope waveform of the new signal output from said summing means is the first derivative of the envelope waveform of said signal applied to both said impedance means and said delay means.

6. The signal processor in accordance with claim 5 wherein the signal delay introduced by said delay means is equal to one-half the period of the carrier radio frequency of said amplitude modulated signal input to said delay means.

7. A signal pre-processor processing amplitude modulated radio frequency navigation pulse signals received by a Loran-C navigation receiver to improve the signal-to-noise ratio thereof comprising:
   delay means to which said radio frequency signals are applied and output therefrom after being delayed in time by an integral multiple of one-half periods of the carrier frequency of said radio frequency signals;
   impedance means to which said radio frequency signals are also applied and then output therefrom; and
   means for algebraically combining the radio frequency signals output from both said delay means and said impedance means to produce a new amplitude modulated signal having the same radio frequency.

8. The signal processor in accordance with claim 7 wherein said impedance means has substantially the same impedance as said delay means so that the radio frequency signals output from said delay means and from said impedance means are substantially of the same amplitude.

9. The signal processor in accordance with claim 7 wherein said impedance means has the same impedance as said delay means so that the radio frequency signals output from said impedance means and said delay means are of the same amplitude, and the envelope waveform of the new signal output from said combining means is the first derivative of the envelope waveform of said signal applied to both said impedance means and said delay means.

10. The signal processor in accordance with claim 1 wherein the signal delay introduced by said delay means is equal to one-half the period of the carrier radio frequency of said signal input to said delay means.

11. A method of processing hyperbolic navigation amplitude modulated radio frequency pulse signals on a point-by-point, cycle-by-cycle basis to improve the signal-to-noise ratio on selected portions of the pulse signal comprising the steps of:
  shifting a received undemodulated pulse by an integral multiple of one-half periods of the carrier frequency of said radio frequency signals with relationship to said received undemodulated pulse signals; and
  algebraically combining said shifted signal with said received undemodulated pulse signal to derive a new radio frequency signal wherein noise is suppressed in the selected portions thereof.

* * * * *